CHROMINANCE-SIGNAL COMPONENT-SELECTION SYSTEM

Filed Dec. 8, 1954 4 Sheets-Sheet 1

June 14, 1960 B. D. LOUGHLIN 2,941,072

CHROMINANCE-SIGNAL COMPONENT-SELECTION SYSTEM

Filed Dec. 8, 1954 4 Sheets-Sheet 2

CHROMINANCE-SIGNAL COMPONENT-SELECTION SYSTEM

Filed Dec. 8, 1954 4 Sheets-Sheet 4

United States Patent Office 2,941,072

Patented June 14, 1960

2,941,072

CHROMINANCE-SIGNAL COMPONENT-SELECTION SYSTEM

Bernard D. Loughlin, Lynbrook, N.Y., assignor to Hazeltine Research, Inc., Chicago, Ill., a corporation of Illinois Filed Dec. 8, 1954, Ser. No. 473,914

17 Claims. (Cl. 250—27)

*General*

This invention relates to systems of the type which selects one or more chrominance-signal components along predetermined axes of a received chrominance subcarrier signal. Such systems have particular utility in color-television receivers utilizing one-gun sequential color displays.

Applicant has previously described systems for selecting chrominance-signal components along predetermined axes of a chrominance subcarrier signal in an article entitled "Processing of the NTSC Color Signal for One-Gun Sequential Color Displays," Proceedings of the I.R.E., January 1954. Such systems are also described and claimed in applicant's copending applications Serial No. 384,237, now United States Patent No. 2,734,940, also the subject of reissue application Serial No. 686,551, filed September 24, 1957, entitled "Image-Reproducing System for a Color-Television Receiver," filed October 5, 1953, and Serial No. 466,999, now United States Patent No. 2,814,778, entitled "Signal-Modifying Apparatus," filed November 5, 1954. These systems are particularly useful in converting a received chrominance subcarrier signal to the form required to reproduce a faithful color picture on a one-gun sequential cathode-ray tube color display, such as a display using a single-gun cathode-ray tube having strip phosphors and controlling the cathode-ray beam by a focus-mask or grid structure adjacent the phosphors, known as the Chromatron tube. The signals applied to such a tube are ordinarily sampled in reversing color sequence. The systems are also particularly useful in connection with one-gun sequential cathode-ray tube displays employing sampling in continuous color sequence, for example, a one-gun shadow-mask cathode-ray tube.

While the chrominance-signal component-selection systems previously described for use with the focus-mask phosphor strip are entirely satisfactory with respect to operability and performance, they may involve more tubes and associated circuitry than may be desirable for some applications. Also, the operating stability of such systems over long periods of time has, in general, been dependent on tube characteristics which may vary with tube aging. In connection with one-gun cathode-ray tube color displays symmetrically sampled in continuous color sequence, it is desirable to employ a chrominance-signal component-selection system described as a subcarrier molder or modifier in the above-mentioned article from the Proceedings of the I.R.E. and described and claimed in applicant's aforementioned copending application Serial No. 466,999, now United States Patent No. 2,814,778. Prior subcarrier molders have, in general, been subject to the limitation that the gain ratio of the molder along quadrature axes depends on the characteristics of the molder tube and also on the amplitude of the applied signals.

It is an object of the present invention, therefore, to provide a new and improved system for selecting one or more chrominance-signal components along one or more predetermined axes of a received chrominance subcarrier signal which avoids one or more of the above-mentioned limitations of prior such systems.

It is another object of the invention to provide a new and improved chrominance-signal component-selection system of simple and inexpensive construction useful in connection with a one-gun sequential cathode-ray tube display sampled in reversing color sequence.

It is another object of the invention to provide a new and improved chrominance-signal component-selection system useful in connection with a one-gun sequential cathode-ray tube display sampled in continuous color sequence.

It is another object of the invention to provide a new and improved chrominance-signal component-selection system which operates in an extremely stable manner over long periods of time.

It is another object of the invention to provide a new and improved chrominance-signal component-selection system having a gain ratio along predetermined quadrature axes which is substantially independent of applied signal amplitude and tube characteristics.

It is another object of the invention to provide a new and improved chrominance-signal component selection system which employs a minimum number of electron-discharge tubes.

In accordance with a particular form of the invention, in a color-television receiver, a system for selecting at least one chrominance-signal component along at least one predetermined axis of a received chrominance subcarrier signal comprises first supply circuit means for supplying a chrominance subcarrier signal and second supply circuit means for supplying a reference signal having a frequency equal to an integral multiple of the frequency of the subcarrier signal. The system also includes electrode-controlled circuit means having a beam-intensity control electrode and cathode coupled to one of the supply-circuit means and having a pair of output electrodes and having electron beam-deflection means coupled to the other of the supply-circuit means for developing at the output electrodes current components at an integral multiple of the frequency of the subcarrier signal derived along at least one predetermined axis of the subcarrier signal. The system also includes frequency-responsive output circuit means coupled to the output electrodes for deriving from the current components at least one output signal having a frequency equal to an integral multiple of the frequency of the subcarrier signal and representative of at least one chrominance-signal component derived along at least one predetermined axis of the subcarrier signal.

For a better understanding of the present invention, together with other and further objects thereof, reference is had to the following description taken in connection with the accompanying drawings, and its scope will be pointed out in the appended claims.

Referring to the drawings.

Figure 1:
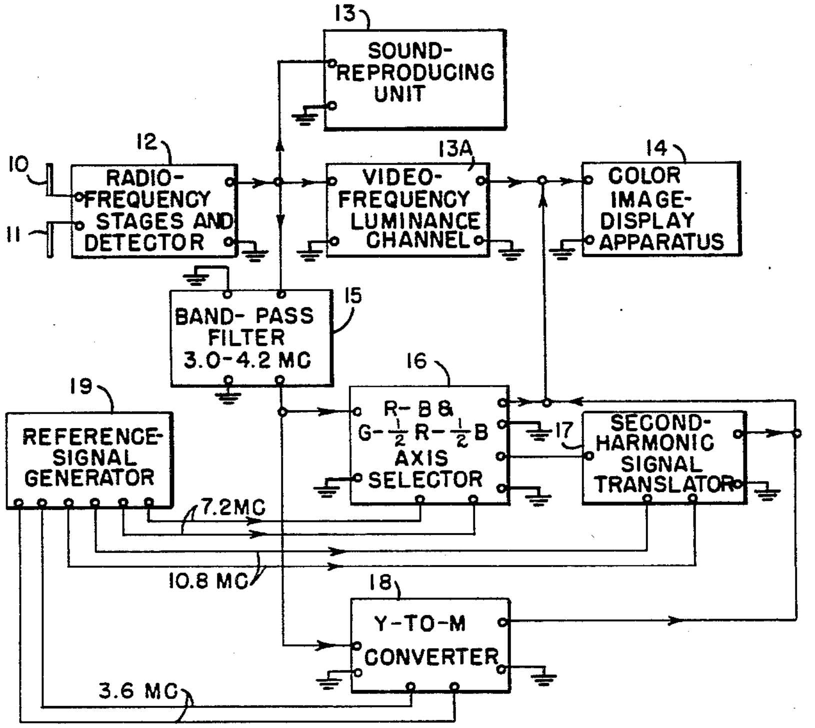
Fig. 1 is a schematic circuit diagram of a color-television receiver employing a chrominance-signal component-selection system constructed in accordance with the invention.
Figure 2:
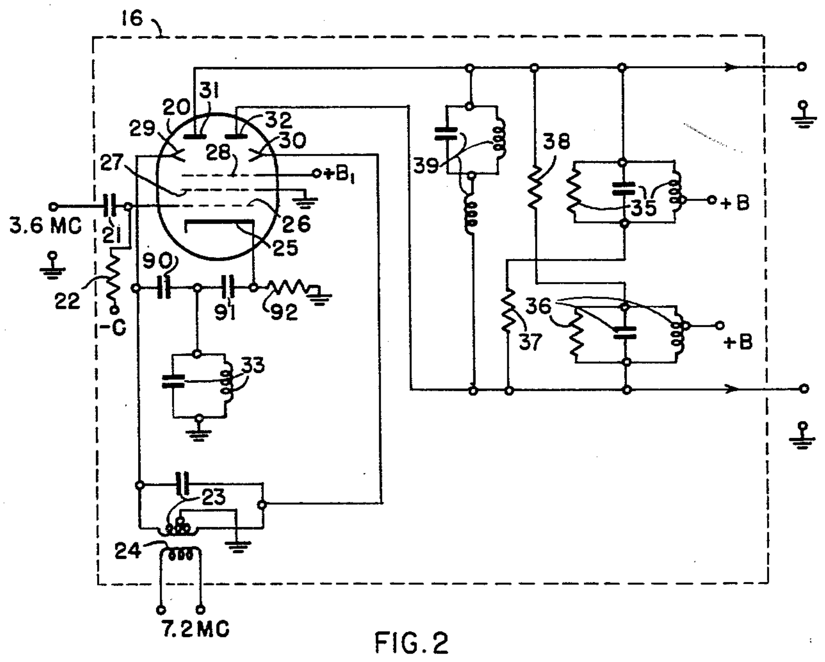
Fig. 2 is a detailed circuit diagram of the chrominance-signal component-selection system of the Fig. 1 receiver.
Figure 3:
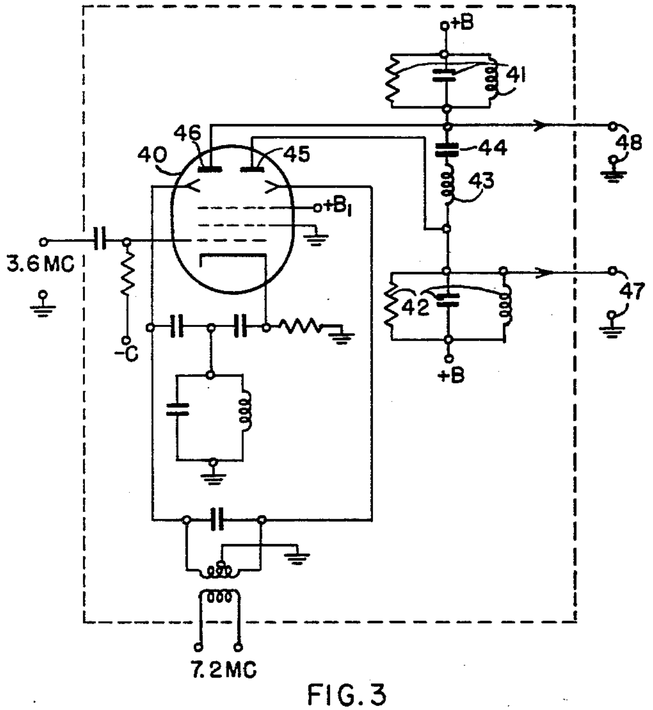
Figure 2A:
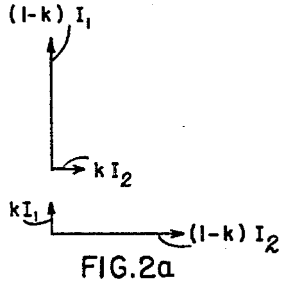
Figure 4A:
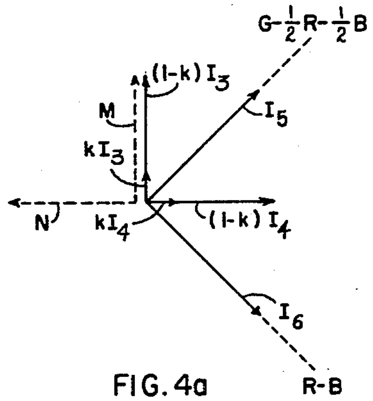
Figure 4B:
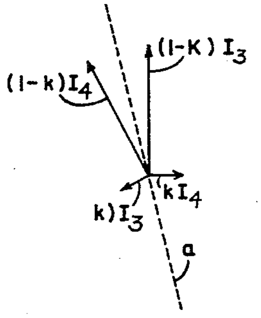
Figure 4C:
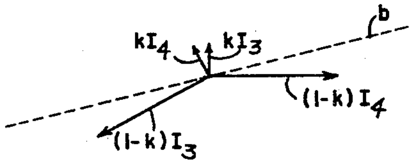
Figure 5:
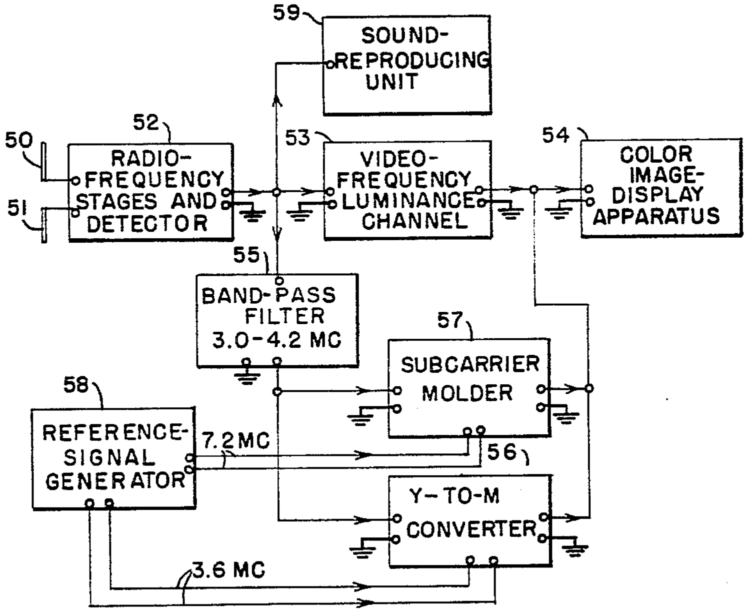
Figure 6:
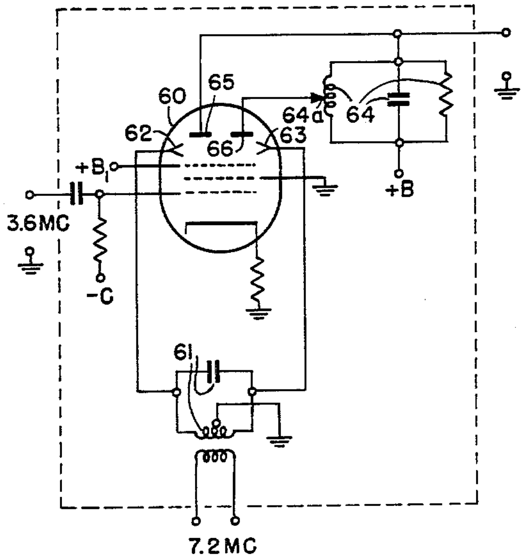
Figure 9:
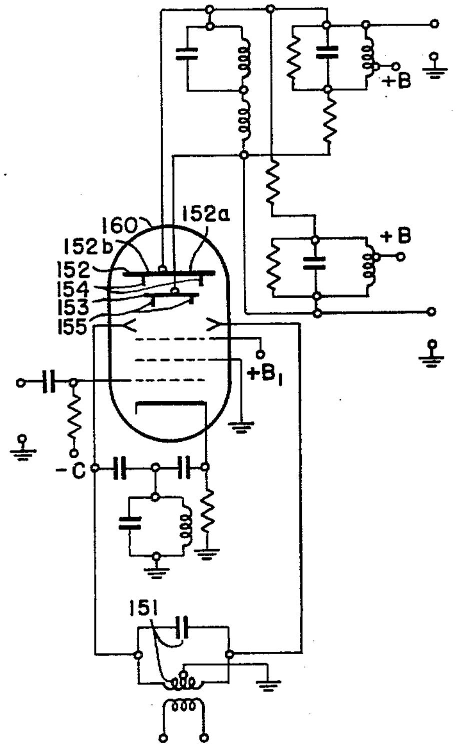
Figure 7:
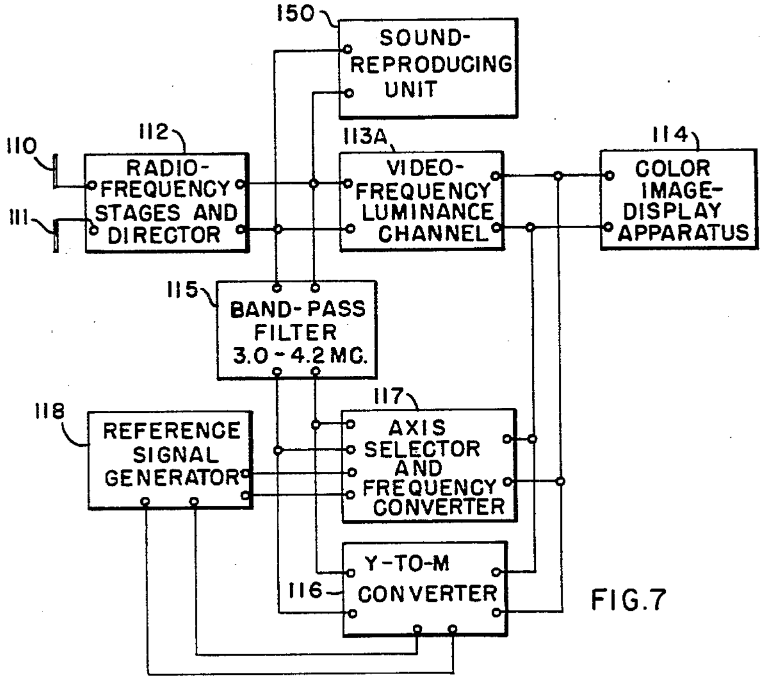
Figure 8:
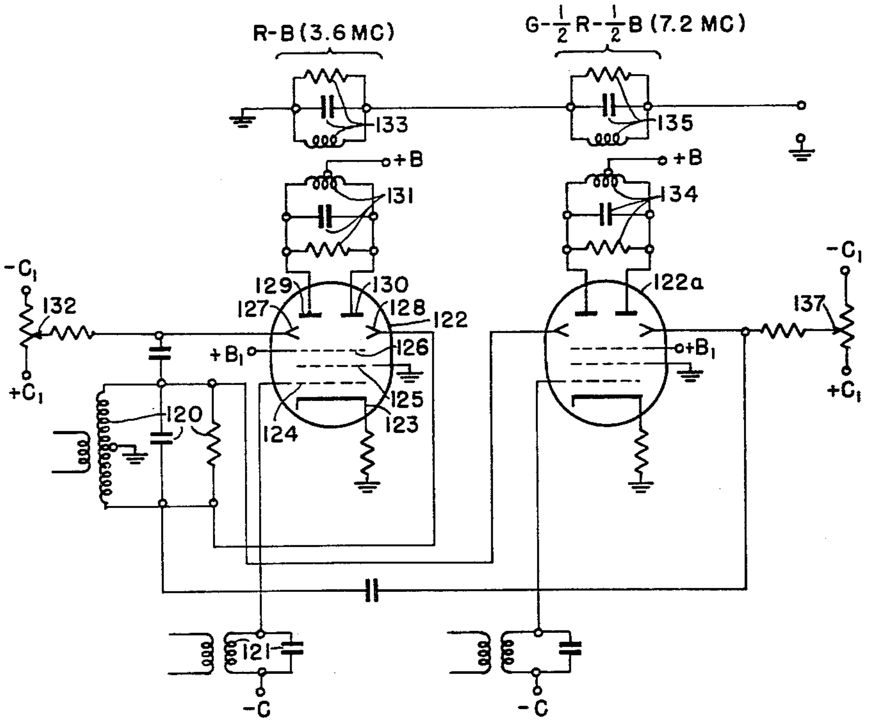

Fig. 2*a* is a vector diagram to aid in explaining the operation of the Fig. 2 system;

Fig. 3 is a detailed circuit diagram of a modified chrominance-signal component-selection system suitable for use in the Fig. 1 receiver;

Figs. 4*a*, 4*b*, and 4*c* are vector diagrams to aid in explaining the operation of the Fig. 3 system;

Fig. 5 is a schematic circuit diagram of a color-television receiver employing another form of chrominance-signal component-selection system constructed in accordance with the invention;

Fig. 6 is a detailed circuit diagram of the chrominance-signal component-selection system of the Fig. 5 receiver;

Fig. 7 is a schematic circuit diagram of a color-television receiver including another form of chrominance-signal component-selection system constructed in accordance with the invention;

Fig. 8 is a detailed circuit diagram of the Fig. 7 chrominance-signal component-selection system, and Fig. 9 is a detailed circuit diagram of another form of chrominance-signal component-selection system constructed in accordance with the invention.

*Description and operation of Fig. 1 receiver*

The Fig. 1 color-television receiver comprises an antenna system 10, 11 coupled to radio-frequency stages and detector 12 for applying thereto a received color-television signal. The radio-frequency stages and detector 12 amplify the received signal and detect the video-frequency modulation components thereof as well as derive a sound intermediate-frequency signal. The sound signal is applied to a sound-reproducing unit 13 of conventional construction for amplification and translation to sound.

The unit 12 applies the detected video-frequency signal to the video-frequency luminance channel 13A which amplifies the luminance component and applies it to a color image-display apparatus 14 which may be, for example, of the focus-mask phosphor-strip type. Suitable line-scan and field-scan generators (not shown) responsive to synchronizing components of the received television signal are associated with apparatus 14. The unit 12 also applies the detected video-frequency signal to a band-pass filter 15 having a pass band of, for example, 3.0–4.2 megacycles which is effective to translate the chrominance subcarrier signal. The filter 15 applies the chrominance subcarrier signal to an axis selector 16, constructed in accordance with the invention, for selecting chrominance-signal components along the $R-B$ and $G-\frac{1}{2}R-\frac{1}{2}B$ axes of the chrominance subcarrier for purposes explained in the above-mentioned article of the Proceedings of the I.R.E. The axis selector 16 applies the $G-\frac{1}{2}R-\frac{1}{2}B$ component to a second-harmonic signal translator 17 which may be of a type described in the above-mentioned article. The $R-B$ chrominance component at subcarrier frequency and the $G-\frac{1}{2}R-\frac{1}{2}B$ component at second-harmonic frequency are then applied by units 16 and 17, respectively, to the color image-display apparatus 14 to develop the desired chrominance of the reproduced image.

The band-pass filter 15 also applies the chrominance subcarrier signal to a Y-to-M converter 18 which derives a luminance-correction signal in a manner explained in the above-mentioned article for application to the color image-display apparatus 14. The luminance signal and correction signal then effectively combine to develop a monochrome signal which causes the reproduction of a picture having the proper luminance components on the tube utilized. The units 16, 17, and 18 utilize reference signals of frequencies of 7.2, 10.8, and 3.6 megacycles, respectively, supplied by a reference-signal generator 19 which may be operatively synchronized with the color burst of the transmitted signal by means not shown. The operation of the generator 19 in connection with unit 16 will be more fully described hereinafter while the operation of the generator in connection with units 17 and 18 is fully described in the above-mentioned article. All of the foregoing units, with the exception of unit 16, may be of conventional construction and operation.

*Description of Fig. 2 system*

Referring now more particularly to Fig. 2 of the drawings, there is represented a system, constructed in accordance with the invention, for selecting one or more chrominance-signal components of a received chrominance subcarrier signal comprising first circuit means for supplying a chrominance subcarrier signal. This circuit means preferably comprises the control electrode-cathode circuit of a tube 20 including a coupling condenser and grid-leak resistor network 21, 22 which is coupled to an output circuit of the band-pass filter 15 of Fig. 1. The system also includes second circuit means for supplying a reference signal having a frequency equal to an integral multiple of the frequency of the subcarrier. As explained subsequently in connection with the Fig. 9 embodiment, the integral multiple may be equal to the subcarrier frequency while in the Fig. 2 system the reference signal has a second-harmonic frequency relation to the subcarrier signal. The second circuit means preferably comprises a resonant circuit 23 tuned to the second-harmonic frequency and coupled to the deflection electrodes 29, 30 of tube 20 and having an associated primary winding 24 coupled to the reference-signal generator 19 for applying a second-harmonic signal thereto.

The system also includes electrode-controlled circuit means having a beam-intensity control electrode coupled to the first circuit means and having a pair of output electrodes and having electron beam-deflection means coupled to the second circuit means for developing at the output electrodes current components representative of chrominance-signal components derived along predetermined axes of the subcarrier signal. More particularly, this circuit means preferably comprises electron-discharge tube 20 of the beam-switching type such as, for example, a 6AR8 type such as described in an article by Adler and Heuer, entitled "Color Decoder Simplifications Based on a Beam Deflection Tube," Transactions of the I.R.E., Professional Group on Broadcast and Television Receivers, January 1954. The tube 20 has a cathode 25, beam-intensity control electrode 26, focusing electrode 27, accelerator electrode 28, beam-deflection electrodes 29, 30, and anodes 31, 32.

The system preferably also includes circuit means coupled to the tube 20 for supplying thereto a heterodyne signal having a second-harmonic frequency relation to the subcarrier signal, the tube and associated circuit being effective to derive from the heterodyne signal and the chrominance subcarrier signal a reversed-phase chrominance subcarrier signal for developing at the anodes 31, 32 current components which are in quadrature-phase relation and which are representative of desired non-quadrature chrominance-signal components. This circuit means preferably comprises a resonant circuit 33 tuned to the second harmonic of the subcarrier signal frequency and coupled through condenser 90 across a portion of resonant circuit 23, 24 for shifting the phase of the reference signal developed across resonant circuit 33 with respect to that across resonant circuits 23, 24. The resonant circuit 33 is coupled through condenser 91 across the cathode resistor 92 for developing a reference signal of desired phase in the control electrode-cathode circuit of tube 20. The anodes of the tube 20 are individually coupled to resonant circuits 35, 36 tuned to the subcarrier signal frequency and connected to a source of potential +B at suitable tap points on the inductors of the tuned circuits.

The chrominance-signal selection system preferably also includes circuit means for cross-coupling the anodes 31, 32 to develop resultant currents representative of the desired chrominance-signal components to the substantially complete exclusion of undesired currents. This circuit means comprises resistors 37, 38 coupled between the tuned circuits 35, 36, respectively, and the anodes 32, 31, respectively. There is also coupled between the anodes 31, 32 a multiresonant circuit 39 which is parallel-resonant and presents a high impedance at the subcarrier signal frequency while it is series-resonant and presents a low impedance at the second-harmonic signal frequency.

*Operation of Fig. 2 system*

Considering now the operation of the Fig. 2 chrominance-signal component-selection system, a chrominance subcarrier signal having a frequency of, for example, approximately 3.6 megacycles is applied by unit 15 of Fig. 1 to the control electrode-cathode circuit of the tube 20 while a signal having a frequency of, for example, approximately 7.2 megacycles is applied to the beam-deflection electrodes 29, 30 of the tube 20 by the reference-signal generator 19 of Fig. 1. The beam-deflection electrodes are, therefore, effective to deflect the electron stream of the tube 20 from one anode to the other at a 7.2 megacycle rate. Accordingly, the currents at anodes 31, 32 of the tube 20 represent quadrature components of the 3.6 megacycle current variations within the tube 20.

As mentioned previously, however, it is desirable, in developing signals for application to the Chromatron tube, to derive signals along the $R-B$ and $G-\frac{1}{2}R-\frac{1}{2}B$ axes of the applied chrominance subcarrier signal. As explained in the previously mentioned Proceedings of the I.R.E. article, these axes are not in quadrature in the chrominance subcarrier signal. Accordingly, it is necessary to mold the applied chrominance subcarrier signal so that the nonquadrature components thereof are represented by quadrature components of the current of the tube 20.

The subcarrier molding operation is accomplished by applying a 7.2 megacycle signal from the resonant circuit 23, 24 to the resonant circuit 33 of the system 16. This 7.2 megacycle signal then serves as a heterodyne signal which varies the gain of the tube 20 at a 7.2 megacycle rate to introduce a reversed-phase sequence 3.6 megacycle signal in the tube current in a manner analogous to that explained in connection with subcarrier molding in the Proceedings of the I.R.E. article. The reversed-phase sequence subcarrier has an amplitude and static phase shift which may be controlled by adjusting the amplitude and phase of the 7.2 megacycle signal applied to the cathode circuit of tube 20.

The resultant of the original subcarrier current components and the reversed subcarrier current components of proper amplitude and phase are subcarrier current components having the original phase sequence but having desired components in a quadrature-phase relation. These desired current components are then derived at the anodes 31 and 32 for application to the color image-display apparatus 14 and the second-harmonic signal translator 17.

The amplitude of the reference signal applied to the beam-deflection electrodes preferably is sufficient to deflect all the space current of the tube from one anode to the other causing the tube to operate as a current switch having a 50 percent duty cycle of current derivation at each anode. It may be shown that because of the 50 percent duty cycle of the current-deriving operation at each anode of the tube 20, the anode currents also include undesired quadrature components and thus are not completely independent. This may be appreciated by considering each anode of the tube as a current switch to which there are applied sine- and cosine-current components. By means of a Fourier analysis, the amplitude of the sine and cosine fundamental-frequency components which appear in the output circuit after translation by the switch may be derived. With a duty cycle of 50 percent, it may be shown that the desired current component at each anode has an amplitude of approximately .82 times the amplitude of the desired component appearing in the electron stream of the tube and an amplitude of .18 times the amplitude of the undesired quadrature component appearing in the electron beam of the tube. Such operation is designated incomplete axis selection.

In order to provide complete axis selection, that is, to eliminate the undesired quadrature components from the individual output circuits of the system 16, the anode circuits of the tube are cross-coupled by means of resistors 37, 38. These resistors are proportioned and the inductors of the resonant circuits 35, 36 are tapped in such manner that a component equal in amplitude but opposite in phase to the undesired quadrature component is transferred from each anode circuit to the other. Thus, as represented in Fig. 2*a*, the vector $(1-k)I_1$ represents the desired component of current at anode 31 while quadrature component $kI_2$ represents the undesired component at anode 31. ($k$=.18 for 50 percent duty cycle). Similarly, current component $(1-k)I_2$ represents the desired component at anode 32 while component $kI_1$ represents the undesired quadrature component at anode 32. Accordingly, by providing a cross-coupling factor of $$\frac{k}{1-k}$$

a vector component $kI_2$ of opposite polarity to the component derived at anode 31 is coupled from anode 32 to anode 31 to cancel the undesired quadrature component at anode 31. There is also coupled to anode 31 a small component having an amplitude $$\frac{k^2I_1}{(1-k)}$$

opposite in polarity to the component $(1-k)I_1$ derived at the anode 31 so that the resultant current effective to develop an output voltage at anode 31 has an amplitude $$\frac{(1-2k)I_1}{(1-k)}$$

Likewise, a current component $kI_1$ of opposite polarity to the quadrature-current component derived at anode 32 is applied from the circuit of anode 31 to the circuit of anode 32. Also, a small component having an amplitude $$\frac{k^2I_2}{(1-k)}$$

is coupled to the circuit of anode 32 so that the resultant current effective to develop an output voltage at the anode 32 has an amplitude $$\frac{(1-2k)I_2}{(1-k)}$$

and is in quadratus-phase relation to the resultant current at anode 31. Because of the subcarrier molding action, the resultant quadrature-current components at the anodes 31, 32 are representative of the $R-B$ and $G-\frac{1}{2}R-\frac{1}{2}B$ nonquadrature chrominance subcarrier signal components supplied to the tube 20.

The multiresonant circuit 39 is effective to present a low impedance between the anodes 31, 32 at 7.2 megacycles to prevent 7.2 megacycle components of anode current from developing output voltages across the resonant circuits 35, 36.

In the event that complete axis selection is not necessary for a particular application, the cross-coupling between anodes 31 and 32 may be eliminated by removing resistors 37, 38. Also, if the output currents derived by the tube 20 are to be representative of quadrature components of the applied chrominance signal for a particular application, the subcarrier molding operation may be eliminated by removing resonant circuit 33 and associated condensers 90, 91.

*Description of Fig. 3 system*

Referring now to Fig. 3 of the drawings, the chrominance-signal selection system there represented is of similar construction to the Fig. 2 system with the exception that the anode circuit of beam-switching tube 40 includes a pjair of circuits resonant at the subcarrier frequency and coupled together by means of series-connected inductor 43 and condenser 44 which are series-resonant at a second harmonic of the subcarrier signal and which serve as a coupling unit at the subcarrier signal frequency. The resonant circuits 41, 32 and the coupling units 43, 44 are effective as circuit means for providing a quadrature-phase shift of each of the current components developed at the output electrodes of the tube 40 and for combining linearly each current component with the other phase-shifted component to develop augmented current components derived along a set of predetermined axes of the subcarrier signal which is phase-shifted from the axes of derivation of the first-mentioned current components.

The Fig. 3 system may be included in the Fig. 1 receiver in lieu of unit 16 if the phase of the 7.2 megacycle signal developed by the reference-signal generator and applied to the system for beam-deflection purposes is selected to develop current components at the output electrodes representative of chrominance-signal components derived along a set of predetermined axes of a subcarrier signal in a manner fore fully explained presently.

*Operation of Fig. 3 system*

Referring now more particularly to Fig. 4*a*, the chrominance subcarrier signal, as it controls the space current of the tube 40, may, for simplicity of explanation, be considered to comprise two quadrature components $I_5$ and $I_6$ along the $G-\frac{1}{2}R-\frac{1}{2}B$ and $R-B$ axes, respectively. The phase of the 7.2 megacycle signal applied to the beam-deflection electrodes of the tube 40 is so selected that the primary current components developed at the anodes 45, 46 of the tube 40 are represented by quadrature-current components $(1-k)I_3$ and $(1-k)I_4$, respectively, angularly disposed with respect to the $G-\frac{1}{2}R-\frac{1}{2}B$ and $R-B$ axes of the desired current components. There are also derived at the anodes 45, 46 of the tube 40 quadrature components $kI_4$ and $kI_3$, respectively, for reasons previously explained in connection with the Fig. 2 embodiment. The components $kI_4$ and $kI_3$ will be neglected for the time being. Resolving the current components $I_5$ and $I_6$ along the axis of component $(1-k)I_3$, the current component $(1-k)I_3$ may be expressed as follows:

$$(1-k)I_3=(1-k)(.707I_5-.707I_6) \qquad (1)$$

Similarly, resolving current components $I_5$ and $I_6$ into components along the axis of component $(1-k)I_4$, the component $(1-k)I_4$ may be expressed as follows:

$$(1-k)I_4=(1-k)(.707I_5+.707I_6) \qquad (2)$$

By adding Equations 1 and 2, it may be shown that an in-phase addition of current components $(1-k)I_3$ and $(1-k)I_4$ develops an augmented component having the composition of a signal selected along the $G-\frac{1}{2}R-\frac{1}{2}B$ axis as expressed by the following equation:

$$(1-k)(I_3+I_4)=(1-k)1.414I_5 \qquad (3)$$

Similarly, by subtracting Equation 1 from Equation 2, it may be shown that an agumented current component having the composition of a signal selected along the $R-B$ axis is developed by an in-phase subtraction of component $(1-k)I_3$ from component $(1-k)I_4$:

$$(1-k)(I_4-I_3)=(1-k)1.414I_6 \qquad (4)$$

The in-phase addition of current components $(1-k)I_3$ and $(1-k)I_4$ is accomplished in the Fig. 3 embodiment by means of the coupling unit 43, 44 which acts as a capacitive coupling unit. Current component $(1-k)I_4$ derived at anode 46 of the tube 40 is coupled with a 90° phase lead from the resonant circuit 41 to the resonant circuit 42 where this component, indicated in Fig. 4*a* by broken-line arrow M, combines in phase with the current component $(1-k)I_3$. Accordingly, as indicated by Equation 3, the in-phase addition results in the derivation at output terminals 47, 47 of a current component of amplitude $(1-k)1.4I_5$ and is thus representative of a current component derived along the $G-\frac{1}{2}R-\frac{1}{2}B$ axis. Likewise, the coupling unit 43, 44 translates current component $(1-k)I_3$ derived at anode 45 of the tube 40 from the resonant circuit 42 to the resonant circuit 41 with a 90° phase lead, as indicated by broken-line arrow N of Fig. 4*a*. This results in the subtraction of current component $(1-k)I_3$ from component $(1-k)I_4$ in a manner indicated by Equation 4. Accordingly, there is derived at output terminals 48, 48 an augmented component having an amplitude of $(1-k)1.4I_6$ and thus representative of a current component derived along the $R-B$ axis.

Note that the amplitudes $(1-k)1.4I_5$ and $(1-k)1.4I_6$ of the signals derived at terminals 47, 47 and 48, 48, respectively, are 1.4 times as great as the amplitudes of corresponding signals $(1-k)I_5$ and $(1-k)I_6$ which could be derived by adjustment of the phase of the 7.2 megacycle reference signal applied to the tube 40 in the Fig. 3 system with the additional modification of omitting the coupling unit 43, 44.

The Fig. 3 system as thus far described provides satisfactory but incomplete axis selection in that an undesired quadrature component is derived at each of the output terminals. The circuit values of the elements represented in the Fig. 3 system, however, may be altered to cause the system to provide complete axis selection. To this end, the values of the Fig. 3 system may be altered to provide circuit means for shifting the phase of the current components at one anode with respect to the components at the other anode sufficiently to provide a linear addition of the two resultant components. This circuit means comprises the resonant circuits 41, 42 and the coupling unit 43, 44 when the resonant circuits 41, 42 are tuned slightly below the frequency of the chrominance-signal subcarrier.

The Fig. 3 system then operates in the following manner. The current components $(1-k)I_4$ and $kI_3$ derived at the anode 46 are shifted by more than 90° by means of the coupling unit 43, 44 and resonant circuit 41 when translated through the coupling unit 43, 44 to resonant circuit 42 with the result that the phase-shifted current component $(1-k)I_4$, represented in Fig. 4*b*, and component $kI_4$ derived at anode 45 add vectorially to provide a resultant along axis *a* represented in broken line in Fig. 4*b*. Similarly, current component $(1-k)I_3$ derived at anode 45 and phase-shifted current component $kI_3$ add vectorially to develop a resultant along axis *a* of Fig. 4*b*. The two resultant components along axis *a* add linearly to develop a current component which has an amplitude approximately equal to the sum of the components $(1-k)I_3$ and $(1-k)I_4$. The resultant current derived at output terminals 47, 47, therefore, is an augmented current component of amplitude approximately equal to $(1-k)1.4I_5$ and representative of the current derived along the $G-\frac{1}{2}R-\frac{1}{2}B$ axis. There is no quadrature-current component developed at output terminals 47, 47.

In a similar manner as represented in Fig. 4*c*, current component $(1-k)I_3$ and component $kI_4$ derived at anode 45 are phase-shifted by more than 90° by means of coupling unit 43, 44 and resonant circuit 42 when translated through the coupling unit 43, 44 to the resonant circuit 41. Current components $kI_3$ and $(1-k)I_3$ and components $(1-k)I_4$ and $kI_4$, represented in Fig. 4*c*, add vectorially to provide resultants of opposite polarity along axis *b*. The algebraic sum of these resultant components is a current component having an amplitude approximately equal to the component $(1-k)I_4$ less the component $(1-k)I_3$. Accordingly, there is derived along the axis *b* an augmented current component having a value approximately equal to $(1-k)1.4I_6$ and representative of the current component along the $R-B$ axis. Accordingly, there is developed at output terminals 48, 48 an augmented current component representative of current components along the $R-B$ axis with no quadrature component. In this manner, the Fig. 3 system is capable of providing complete axis selection.

*Description and operation of Fig. 5 receiver*

The Fig. 5 color-television receiver comprises an antenna system 50, 51 to which are coupled, in cascade, radio-frequency stages and detector 52, video-frequency luminance channel 53, and color image-display apparatus 54. Units 52 and 53 may be of similar construction to corresponding units of the Fig. 1 receiver while the color image-display apparatus 54 preferably comprises a single-gun tricolor cathode-ray tube of the type symmetrically sampled in continuous color sequence, for example, the shadow-mask type which is capable of reproducing a color image in response to a dot-sequential signal applied thereto.

The receiver also includes a band-pass filter 55 of similar construction to the corresponding filter of the Fig. 1 receiver for translating the chrominance-signal subcarrier while rejecting the low-frequency portion of the composite video-frequency signal derived at the detector of unit 52. The filter 55 applies the chrominance-signal subcarrier to a Y-to-M converter 56 similar to the converter 18 of the Fig. 1 receiver. The Y-to-M converter 56 applies a suitable luminance-correction signal to the display apparatus 54 to provide constant luminance operation for the receiver.

The filter 55 also applies the chrominance-signal subcarrier to a subcarrier molder 57, constructed in accordance with the invention and more fully described hereinafter, for molding the subcarrier signal to the form necessary for accurate color reproduction by the color image-display apparatus 54.

Units 56 and 57 utilize reference signals of frequencies of 3.6 and 7.2 megacycles, respectively, which are supplied by a reference-signal generator 58 of conventional construction. The receiver also includes a suitable sound-reproducing unit 59 connected to the unit 52.

*Description of Fig. 6 system*

Subcarrier molders are employed for the primary purpose of repeating chrominance-signal components with modified angle and amplitude relations. Subcarrier molders are also described as elliptical gain amplifiers because a signal component along one quadrature axis is amplified by a different factor from a signal component along another quadrature axis. Subcarrier molders having any desired elliptical gain characteristic can be provided by gating an electron tube on and off at twice the subcarrier frequency with a suitable angle of conduction determined by the desired gain ratio. While prior subcarrier molders have proved satisfactory, they have, in general, been subject to the limitation that the effective angle of conduction and, hence, the gain ratio is dependent upon the amplitude of the applied signals and the characteristics of the electron tube which are subject to change. The subcarrier molder constructed in accordance with the invention and presently to be described has the advantage that the gain ratio is determined by stable passive circuit elements which are not subject to such great change.

The Fig. 6 subcarrier molder is a chrominance-signal component-selection system employing an electron-discharge tube 60 of the beam-switching type. A reference subcarrier signal having a frequency of, for example, 7.2 megacycles is applied from the unit 58 of Fig. 5 through a resonant circuit 61 to beam-deflection electrodes 62, 63 of the tube 60. The chrominance signal subcarrier is applied to the control electrode-cathode circuit of the tube 60.

The Fig. 6 system includes circuit means coupled to the tube 60 and having a predetermined response ratio to the current components derived at the anodes thereof for deriving therefrom a signal representative of the desired chrominance-signal component suitable for application to a dot-sequential display apparatus. More particularly, this circuit means comprises a resonant circuit 64 to which the anodes of the tube 60 are coupled at different tap points.

*Operation of Fig. 6 system*

As described in the above-mentioned Proceedings of the I.R.E. article, an NTSC chrominance-signal subcarrier preferably is modified for application to a dot-sequential display by increasing the amplitude of the $B-Y$ component relative to the $R-Y$ component. The angle between these components might also be modified to 92° although, for many purposes, a quadrature relation of the modified components is satisfactory. For simplicity of explanation, the Fig. 6 embodiment of the invention will be described as deriving from an NTSC chrominance subcarrier signal $R-Y$ and $B-Y$ components of modified amplitude in quadrature relation although, with suitable phasing of the reference signal applied thereto, $R-Y$ and $B-Y$ components of modified amplitude could be derived in nonquadrature relation.

Assuming that the reference signal applied to the beam-deflection electrodes is so phased with respect to the chrominance-signal subcarrier that the electrode 62 is more positive while the $B-Y$ component of the chrominance-signal subcarrier has maximum amplitude, and the electrode 63 is more positive while the $R-Y$ component has its maximum amplitude, then currents $i_c$, $i_d$ derived at anodes 65 and 66, respectively, may be expressed by the following equations:

$$i_c=(1-k_3)I_7+jk_3I_8 \qquad (5)$$

$$i_d=k_3I_7+j(1-k_3)I_8 \qquad (6)$$

where $k_3$=amplitude factor determined by duty cycle $I_7$ and $I_8$=maximum amplitude of quadrature $B-Y$ and $R-Y$ current components, respectively, in electron stream of tube 60

The voltage developed across the resonant circuit 64 of impedance R in response to these current components may then be expressed:

$$E=R[(1-k_3+k_2k_3)I_7+jk_3+k_2(1-k_3)I_8] \qquad (7)$$

where $k_2$=impedance step-down ratio of resonant circuit 64 as viewed at the tap point 64a

The term representing the amplitude of the voltage components derived from current component $I_7$ represents the voltage derived from the $B-Y$ current component. Similarly, the term representing the voltage component derived from the current component $I_8$ represents the voltage component derived from the $R-Y$ current component. As indicated in the Proceedings of the I.R.E. article, the $B-Y$ component must be increased by a factor of 1.47 with respect to the $R-Y$ component for application to a dot-sequential display. As explained in connection with the Fig. 2 embodiment, the factor $k_3$ has a value of approximately .18 for a 50 percent duty cycle of the beam-switching tube 60. Accordingly, the ratio of the coefficient of the term $I_7$ of Equation 7 to the coefficient of the term $I_8$ of that equation is equal to 1.47 when the factor $k_2$ representing the impedance step-down ratio of the resonant circuit 64 equals .54 and the Fig. 6 system is then effective to derive the desired dot-sequential chrominance signal.

*Description and operation of Fig. 7 receiver*

The Fig. 7 color-television receiver includes an antenna system 110, 111 to which there are coupled, in cascade, radio-frequency stages and detector 112, video-frequency luminance channel 113A, and color image-display apparatus 114, all of conventional construction. A band-pass filter 115 is coupled to the unit 112 for translating the chrominance subcarrier signal while rejecting the low-frequency portion of the luminance-signal component.

A Y-to-M converter 116 of conventional construction, for developing a luminance-correction signal, is coupled between the filter 115 and the display apparatus 114. An axis selector and frequency converter 117, constructed in accordance with the present invention and more fully described subsequently, is also coupled between the filter 115 and the display apparatus 114 for deriving chrominance-signal components suitable for application to the Chromatron tube, namely, the $R-B$ and $G-\frac{1}{2}R-\frac{1}{2}B$ components of the subcarrier signal.

In connection with the operation of the units 116 and 117, a reference-signal generator 118 supplies reference signals having predetermined amplitude and phase and preferably having a frequency of approximately 3.6 megacycles to the units 116 and 117 to aid in developing the luminance-correction and the chrominance-signal components. A sound-reproducing unit 150 is also included.

*Description of Fig. 8 system*

Referring now more particularly to Fig. 8 of the drawings, there is represented a system, constructed in accordance with the invention, for selecting a chrominance-signal component along a predetermined axis of a received chrominance subcarrier signal. The chrominance-signal component-selection system includes first circuit means for supplying a chrominance subcarrier signal which comprises a resonant circuit 120 tuned to the frequency of the subcarrier signal and coupled to the output circuit of the band-pass filter 115 of Fig. 7.

The system also comprises second circuit means for supplying a reference signal having a frequency equal to an integral multiple of the subcarrier signal and preferably equal to the frequency of the subcarrier signal. The second circuit means comprises a resonant circuit 121 coupled to an output circuit of the reference-signal generator 118 of Fig. 7.

There is also provided electrode-controlled circuit means having a beam-intensity control electrode coupled to the second circuit means and having a pair of output electrodes and having electron beam-deflection means coupled to the first circuit means for developing at the output electrodes current components derived along a predetermined axis of the subcarrier signal. More particularly, the electrode-controlled circuit means comprises an electron-discharge tube 122 of the beam-deflection type having a cathode 123, a beam-intensity control electrode 124 for pulsing the tube into conduction in synchronism with the reference signal, a focusing electrode 125, an accelerator 126, a pair of anodes 129, 130, and and beam deflection electrodes 127, 128 for deflecting the electron stream from one anode to the other in synchronism with the chrominance subcarrier signal.

There is coupled to the anodes 129, 130 of the tube 122 a frequency-responsive output circuit, preferably comprising a resonant circuit 131 tuned to the frequency of the subcarrier signal, for deriving from the anode-current components an output signal having a frequency equal to an integral multiple of the frequency of the subcarrier signal, and preferably equal to the frequency of the subcarrier signal, and which is representative of a chrominance-signal component derived along a predetermined axis of the subcarrier signal. The output circuit of the tube 122 also includes a resonant circuit 133 tuned to the subcarrier signal frequency and inductively coupled to the resonant circuit 131. There is also connected to the beam-deflection electrode 127 a unidirectional or direct-current potential-control device comprising an adjustable voltage divider 132 connected across a source of potential $\pm C_1$.

The system just described is effective to derive an output signal representative of a chrominance-signal component derived, for example, along the $R-B$ axis of the subcarrier signal at a frequency of, for example, 3.6 megacycles. The axis selector and frequency converter 117 also includes a second chrominance-signal component-selection system, constructed in accordance with the invention, which is effective to derive an output signal having a frequency, for example, 7.2 megacycles, equal to the second harmonic of the subcarrier signal and representative of a chrominance-signal component derived along, for example, the $G-\frac{1}{2}R-\frac{1}{2}B$ axis of the subcarrier signal. The second chrominance-signal component-selection system is of identical construction with that just described with the following exceptions. The phase of the reference signal applied to the electron-discharge tube 122*a* of the second system is so selected that the output signal derived by the system is representative of a chrominance-signal component derived along the $G-\frac{1}{2}R-\frac{1}{2}B$ axis of the subcarrier signal. Additionally, the output circuits 134 and 135 of the second system comprise a pair of coupled resonant circuits tuned to the second harmonic of the subcarrier signal frequency in order that the chrominance-signal component derived thereby is at a frequency of, for example, 7.2 megacycles. The resonant circuits 133 and 135 are connected in series across the input circuit of the color image-display apparatus 114 of the Fig. 7 receiver for applying to the Chromatron tube of that display apparatus the $R-B$ and $G-\frac{1}{2}R-\frac{1}{2}B$ chrominance-signal components required by that tube to reproduce a color image having the proper chrominance values.

*Operation of Fig. 8 System*

Considering now the operation of the Fig. 8 system, the reference signal developed across the resonant circuit 121 having a frequency of 3.6 megacycles is effective to pulse the tube 122 into conduction at a 3.6 megacycle rate. The tube preferably is so biased that it is conductive only during a narrow angle interval with respect to the period of the reference signal. In other words, preferably only the peak of the reference signal is effective to pulse the tube into conduction. Also, the amplitude of the chrominace signal applied to the beam-deflection electrodes preferably is sufficiently small that the tube operates within a linear beam-deflection range, that is, the chrominance signal causes a transfer of current from one anode to the other which is proportional to the instantaneous magnitude of the chrominance signal.

It will be assumed initially that no chrominance signal is applied to the deflection electrodes 127, 128 by the resonant circuit 120. Under such operating condition, at a predetermined setting of the voltage divider 132, the current flow in the tube 122 divides equally between the anodes 129 and 130. Pulses of current flowing from the source +B to the anodes 129 and 130 through the resonant circuit 131 then effectively cancel insofar as excitation of the resonant circuit by these pulses is concerned. Accordingly, when no input chrominance signal is supplied, no output signal is developed.

The phase of the reference signal supplied by the resonant circuit 121 may be so selected that the tube 122 is pulsed into conduction when the magnitude of the $R-B$ component of the chrominance signal is at its maximum and when the magnitude of the corresponding quadrature component is at its minimum. Accordingly, when a chrominance signal is applied to the deflection electrodes 127, 128 by the resonant circuit 120, the current which flows in the tube is representative of the amplitude of the $R-B$ component. During the time of the conduction pulses, when the $R-B$ component has a value such that the electrode 127 is more positive than the electrode 128, a major portion of the current of the tube 122 flows from the source +B to the anode 129 and a minor portion flows to the anode 130. The amplitude difference in the current pulses flowing to anodes 129 and 130 is effective to excite the resonant circuit 131 to develop across resonant circuit 133 coupled thereto an output signal of predetermined phase and amplitude which depends upon the amplitude of the $R-B$ component supplied by the resonant circuit 120.

Similarly, when the amplitude of the $R-B$ component developed across the resonant circuit is such that during the conduction intervals of the tube 122 the electrode 128 is positive with respect to the electrode 127, the major portion of current flows from the source +B to the anode 130 and a minor portion flows to the anode 129. The amplitude difference in current pulses is effective to develop an output signal across the resonant circuit 133 of opposite phase to that previously developed and having an amplitude representative of the amplitude of the $R-B$ component during the conduction intervals. The frequency of the output signal is 3.6 megacycles because the conduction pulses occur at 3.6 megacycles and the output circuit is tuned to 3.6 megacycles.

The operation of the system including tube 122*a* is analogous to the system including tube 122 with the difference that the output circuit of the tube 122*a* responds to the second-harmonic component of the current pulses to develop an output signal in a frequency of 7.2 megacycles. Also, the signal applied to the control electrodes of the tube 122*a* is so phased that the current pulses occur during the intervals when the $G-\frac{1}{2}R-\frac{1}{2}B$ component of the chrominance signal has a maximum magnitude and the corresponding quadrature component has a minimum magnitude. Accordingly, there is developed across the resonant circuit 135 an output signal representative of the $G-\frac{1}{2}R-\frac{1}{2}B$ component at a frequency of 7.2 megacycles. The sum of the output signals across the resonant circuits 133 and 135 is applied by the Fig. 8 system to the input circuit of the color image-display apparatus 114.

The Fig. 8 system, under operating conditions thus far described, develops an output signal best suited for application to a color image-display apparatus in which the effective phosphor efficiencies are equal so that a constant cathode-ray beam current provides a desired white picture. With currently employed phosphors, however, the red phosphor efficiency may be several times lower than the green or blue phosphor efficiency. The difference in phosphor efficiencies may be partially compensated by, for example, applying a continuous wave signal to modulate the intensity of the cathode-ray beam as it scans the different phosphors.

Voltage dividers 132 and 137 of the Fig. 8 system may be utilized for this purpose. These dividers may be so adjusted that when no chrominance signal is applied to the system, an output signal is developed in resonant circuits 133 and 135 which is effective to compensate for the different phosphor efficiencies at one point in the black-to-white scale of the reproduced image. For some applications, the difference in phosphor efficiencies may be tolerated or compensated in a different circuit and, in such systems, the voltage dividers 132 and 137 preferably are adjusted to provide anode-current balance with no chrominance signal applied to the Fig. 8 system. It is important to note that in the Fig. 8 system the anode-current balance in either tube is independent of cathode emission and thus is stable notwithstanding tube ageing.

*Description and operation of Fig. 9 system*

Referring now more particularly to Fig. 9 of the drawings, there is represented a chrominance-signal component-selection system constructed in accordance with the invention suitable for use as the $R-B$ and $G-\frac{1}{2}R-\frac{1}{2}B$ axis selector 16 of the Fig. 1 receiver. The Fig. 9 system is similar in construction to the Fig. 2 system with the exceptions that it utilizes an electron-discharge tube 160 of the beam-switching type, more fully to be described presently, and includes a resonant circuit 151 tuned to the subcarrier frequency of 3.6 megacycles and coupled to a suitable circuit of the reference-signal generator 19 for controlling the switching of the beam of the tube 160.

The tube 160 may be of similar construction to the tube 20 of the Fig. 2 embodiment except for its anode structure. The tube 160 includes a pair of anodes 152 and 153 represented diagrammatically. The anode 153 preferably is disposed between the cathode and the anode 152, shielding the central portion of the anode 152 from the electron beam. The two anodes preferably are so disposed that the electron beam strikes the anode 153 when undeflected. Each anode may be constructed with suitable secondary emission baffles 154 and 155.

During the operation of the Fig. 9 system, a 3.6 megacycle chrominance subcarrier signal is applied to the control electrode-cathode circuit of the tube 160 and a 3.6 megacycle reference signal is applied to the particular deflection electrodes by the resonant circuit 151. Thus, during the interval of each subcarrier cycle, the electron beam is displaced from the anode 153 to, for example, the section 152*a* of the anode 152, then to the anode 153, then to the section 152*b* of the anode 152, and again to the anode 153. Thus, each anode is pulsed into conduction twice during the subcarrier cycle. Accordingly, anode-current pulses flow at a 7.2 megacycle rate. The anode-current pulses represent quadrature components of the tube space current which represents the chrominance subcarrier signal because each anode conducts over an interval having a time center 90° displaced from the time center of the interval of conduction of the other anode.

In the remaining respects the operation of the Fig. 9 system is similar to that of the Fig. 2 system and thus the Fig. 9 system is effective to derive output signals representative of the $R-B$ and $G-\frac{1}{2}R-\frac{1}{2}B$ axes of the chrominance subcarrier signal.

While the embodiments of Figs. 2, 3, 8, and 9 have been described as systems which preferably select signals along the $R-B$ and $G-\frac{1}{2}R-\frac{1}{2}B$ axes when operating in conjunction with a focus-mask phosphor-strip tube with signal sampling in reversing color sequence, it should be understood that these axes are those suited for chrominance-component selection for an idealized tube in which the effective primary colors of the display have desired values. It is well known, however, that the chromaticities of the effective primaries of the display may differ from the desired chromaticities because of, for example, secondary electron scattering within the display. Exact compensation for the effective primary color differences to produce correct colors appears to involve more complex circuits than are desirable for present receivers. However, a substantial correction can be accomplished by selecting chrominance-signal components along the $aR-bB-cG$ and $xG-yR-zB$ axes, where the factors $a, b, c$ and $x, y, z$ are determined by the effective primaries of the display with relation to the desired primaries.

From the foregoing descriptions, it will be apparent that a chrominance-signal component-selection system constructed in accordance with the invention has several advantages. The system may be employed as an axis-selection system of simple and inexpensive construction particularly useful in connection with one-gun sequential cathode-ray tube displays of the type sampled in reversing color sequence. The system is capable of providing incomplete or complete axis selection as desired. The system also may be utilized as a subcarrier molder having a stable gain ratio along predetermined quadrature axes and particularly adapted for use in connection with one-gun dot-sequential cathode-ray tube displays of the type sampled in continuous color sequence. The system may also be employed as an axis-selection system and a frequency converter of simple construction. Additionally, in embodiments in which a beam-deflection tube is operated as a beam-switching tube with rapid total deflection of space current from one anode to the other to provide signal sampling, the sampling operation is independent of the amplitude of the applied switching or reference signal so long as it remains above a minimum value which provides total space-current deflection. The switching operation is also substantially independent of the switching-tube characteristics such as gain. Accordingly, such systems operate in an extremely stable manner.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a color-television receiver, a system for selecting at least one chrominance-signal component along at least one predetermined axis of a received chrominance subcarrier signal comprising: first supply circuit means for supplying a chrominance subcarrier signal; second supply circuit means for supplying a reference signal having a frequency equal to an integral multiple of the frequency of said subcarrier signal; electrode-controlled circuit means having a beam-intensity control electrode and cathode coupled to one of said supply-circuit means and having a pair of output electrodes and having electron beam-deflection means coupled to the other of said supply-circuit means for developing at said output electrodes current components at an integral multiple of the frequency of said subcarrier signal and derived along at least one predetermined axis of said subcarrier signal; and frequency-responsive output circuit means coupled to said output electrodes for deriving from said current components at least one output signal having a frequency equal to an integral multiple of said frequency of said subcarrier signal and representative of at least one chrominance-signal component derived along at least one predetermined axis of said subcarrier signal.

2. In a color-television receiver, a system for selecting chrominance-signal components along predetermined axes of a received chrominance subcarrier signal comprising: first circuit means for supplying a chrominance subcarrier signal; second circuit means for supplying a reference signal having a harmonic-frequency relation to said subcarrier signal; electrode-controlled circuit means having a beam-intensity control electrode and cathode coupled to said first circuit means and having a pair of output electrodes and having electron beam-deflection means coupled to said second circuit means for developing at said output electrodes current components representative of chrominance-signal components derived along predetermined axes of said subcarrier signal; and frequency-responsive output circuit means coupled to said output electrodes for deriving from said current components output signals having a frequency equal to an integral multiple of said frequency of said subcarrier signal and representative of chrominance signal components derived along predetermined axes of said subcarrier signal.

3. In a color-television receiver, a system for selecting chrominance-signal components along predetermined axes of a received chrominance subcarrier signal comprising: first circuit means for supplying a chrominance subcarrier signal; second circuit means for supplying a reference signal having a second-harmonic frequency relation to said subcarrier signal; electrode-controlled circuit means having a beam-intensity control electrode and cathode coupled to said first circuit means and having a pair of output electrodes and having electron beam-deflection means coupled to said second circuit means for developing at said output electrodes current components representative of chrominance-signal components derived along predetermined axes of said subcarrier signal; and frequency-responsive output circuit means coupled to said output electrodes for deriving from said current components output signals having a frequency equal to an integral multiple of said frequency of said subcarrier signal and representative of chrominance signal components derived along predetermined axes of said subcarrier signal.

4. In a color-television receiver, a system for selecting chrominance-signal components along predetermined axes of a received chrominance subcarrier signal comprising: first circuit means for supplying a chrominance subcarrier signal; second circuit means for supplying a reference signal having a second-harmonic frequency relation to said subcarrier signal; electrode-controlled circuit means having a beam-intensity control electrode and cathode coupled to said first circuit means and having a pair of output electrodes and having electron beam-deflection means coupled to said second circuit means for developing at said output electrodes current components which are quadrature-phase displaced at the subcarrier frequency and which are representative of chrominance-signal components derived along predetermined axes of said subcarrier signal; and frequency-responsive output circuit means coupled to said output electrodes for deriving from said current components output signals having a frequency equal to an integral multiple of said frequency of said subcarrier signal and representative of chrominance signal components derived along predetermined axes of said subcarrier signal.

5. In a color-television receiver, a system for selecting chrominance-signal components along predetermined axes of a received chrominance subcarrier signal comprising: first circuit means for supplying a chrominance subcarrier signal; second circuit means for supplying a reference signal having a harmonic-frequency relation to said subcarrier signal; electrode-controlled circuit means comprising an electron-discharge tube of the beam-switching type having a beam-intensity control electrode and cathode coupled to said first circuit means and having a pair of output electrodes and having electron beam-deflection electrodes coupled to said second circuit means for switching the electron beam from one output electrode to the other in synchronism with said reference signal for developing at said output electrodes current components representative of chrominance-signal components derived along predetermined axes of said subcarrier signal; and frequency-responsive output circuit means coupled to said output electrodes for deriving from said current components output signals having a frequency equal to an integral multiple of said frequency of said subcarrier signal and representative of chrominance signal components derived along predetermined axes of said subcarrier signal.

6. In a color-television receiver, a system for selecting chrominance-signal components along predetermined axes of a received chrominance subcarrier signal comprising: first circuit means for supplying a chrominance subcarrier signal having desired nonquadrature components for derivation; second circuit means for supplying a reference signal having a second-harmonic frequency relation to said subcarrier signal; electrode-controlled circuit means having a beam-intensity control electrode and cathode coupled to said first circuit means and having a pair of output electrodes and having electron beam-deflection means coupled to said second circuit means; circuit means coupled to said electrode-controlled circuit means for supplying thereto a heterodyne signal having a second-harmonic frequency relation to said subcarrier signal, said electrode-controlled circuit means being effective to derive from said heterodyne signal and said chrominance subcarrier signal a reversed-phase-sequence chrominance subcarrier signal for developing at said output electrodes current components which are in quadrature-phase relation and which are representative of desired nonquadrature chrominance-signal components; and frequency-responsive output circuit means coupled to said output electrodes for deriving from said current components output signals having a frequency equal to an integral multiple of said frequency of said subcarrier signal and representative of chrominance signal components derived along predetermined axes of said subcarrier signal.

7. In a color-television receiver, a system for selecting chrominance-signal components along predetermined axes of a received chrominance subcarrier signal comprising: first circuit means for supplying a chrominance subcarrier signal; second circuit means for supplying a reference signal having a harmonic-frequency relation to said subcarrier signal; electrode-controlled circuit means having a beam-intensity control electrode and cathode coupled to said first circuit means and having a pair of output electrodes and having electron beam-deflection means coupled to said second circuit means for developing at said output electrodes desired current components individually representative of chrominance-signal components derived along predetermined axes of said subcarrier signal; said electro-controlled circuit means also being effective to derive at said output electrodes undesired current components in quadrature-phase relation with said desired current components; circuit means for cross-coupling said output electrodes to develop resultant currents representative of said chrominance-signal components to the substantially complete exclusion of undesired currents; and frequency-responsive output circuit means coupled to said output electrodes for deriving from said current components output signals having a frequency equal to an integral multiple of said frequency of said subcarrier signal and representative of chrominance signal components derived along predetermined axes of said subcarrier signal.

8. In a color-television receiver, a system for selecting one or more chrominance-signal components along predetermined axes of a received chrominance subcarrier signal comprising: first circuit means for supplying a chrominance subcarrier signal; second circuit means for supplying a reference signal having a second-harmonic frequency relation to said subcarrier signal; electrode-controlled circuit means having a beam-intensity control electrode coupled to said first circuit means and having a pair of output electrodes and having electron beam-deflection means coupled to said second circuit means for developing at said output electrodes current components in quadrature-phase relation and representative of chrominance-signal components derived along a first set of predetermined axes of said subcarrier signal; and frequency-responsive output circuit means coupled to said output electrodes for providing a quadrature-phase shift of each of said current components with respect to the other and for combining linearly each current component with the other phase-shifted component to develop augmented current components having a frequency equal to an integral multiple of the frequency of said subcarrier signal derived along a second set of predetermined axes of said subcarrier signal which is phase-shifted from said first set of axes.

9. In a color-television receiver, a system for selecting one or more chrominance-signal components along predetermined axes of a received chrominance subcarrier signal comprising: first circuit means for supplying a chrominance subcarrier signal; second circuit means for supplying a reference signal having a second-harmonic frequency relation to said subcarrier signal; electrode-controlled circuit means having a beam-intensity control electrode coupled to said first circuit means and having a pair of output electrodes and having electron beam-deflection means coupled to said second circuit means for developing at said output electrodes primary current components in quadrature-phase relation and representative of chrominance-signal components derived along a first set of predetermined axes of said subcarrier signal; said electrode-controlled circuit means also being effective to derive at said output electrodes secondary current components quadrature-phase displaced from said primary components; and frequency-responsive output circuit means coupled to said output electrodes for combining the current components derived at said output electrodes and including means for shifting the phase of said current components at one electrode with respect to the components at the other electrode sufficiently to provide a linear addition of the two resultant components for developing augmented current components having a frequency equal to an integral multiple of the frequency of said subcarrier signal along a second set of predetermined axes of said subcarrier signal which is shifted from said first set of axes.

10. In a color-television receiver, a system for selecting one or more chrominance-signal components along predetermined axes of a received chrominance subcarrier signal comprising: first circuit means for supplying a chrominance subcarrier signal; second circuit means for supplying a reference signal having a harmonic-frequency relation to said subcarrier signal; electrode-controlled circuit means having a beam-intensity control electrode coupled to said first circuit means and having a pair of output electrodes and having electron beam-deflection means coupled to said second circuit means for developing at said output electrodes current components representative of chrominance-signal components derived along predetermined axes of said subcarrier signal; and frequency-responsive circuit means coupled to said output electrodes and having a predetermined response ratio to said current components for deriving therefrom an output signal having a frequency equal to an integral multiple of the frequency of said subcarrier signal representative of a desired modified chrominance subcarrier signal.

11. In a color-television receiver, a system for selecting a chrominance-signal component along a predetermined axis of a received chrominance subcarrier signal comprising: first circuit means for supplying a chrominance subcarrier signal; second circuit means for supplying a reference signal having a frequency equal to an integral multiple of the frequency of said subcarrier signal; electrode-controlled circuit means having a beam-intensity control electrode coupled to said second circuit means and having a pair of output electrodes and having electron beam-deflection means coupled to said first circuit means for developing at said output electrodes current components derived along a predetermined axis of said subcarrier signal; and a frequency-responsive output circuit coupled to said output electrodes for deriving from said current components an output signal having a frequency equal to an integral multiple of the frequency of said subcarrier signal and representative of a chrominance-signal component derived along said predetermined axis of said subcarrier signal.

12. In a color-television receiver, a system for selecting a chrominance-signal component along a predetermined axis of a received chrominance subcarrier signal comprising: first circuit means for supplying a chrominance subcarrier signal; second circuit means for supplying a reference signal having a frequency equal to that of said subcarrier signal; electrode-controlled circuit means having a beam-intensity control electrode coupled to said second circuit means and having a pair of output electrodes and having electron beam-deflection means coupled to said first circuit means for developing at said output electrodes current components derived along a predetermined axis of said subcarrier signal; and a frequency-responsive output circuit coupled to said output electrodes for deriving from said current components an output signal having a frequency equal to an integral multiple of the frequency of said subcarrier signal and representative of a chrominance-signal component derived along said predetermined axis of said subcarrier signal.

13. In a color-television receiver, a system for selecting a chrominance-signal component along a predetermined axis of a received chrominance subcarrier signal comprising: first circuit means for supplying a chrominance subcarrier signal; second circuit means for supplying a reference signal having a frequency equal to an integral multiple of the frequency of said subcarrier signal; electrode-controlled circuit means comprising an electron-discharge tube of the beam-deflection type having a beam-intensity control electrode coupled to said second circuit means for pulsing said tube into conduction during narrow angle conduction intervals in synchronism with said reference signal and having a pair of output electrodes and having electron beam-deflection electrodes coupled to said first circuit means for deflecting the electron beam from one output electrode to the other in synchronism with said chrominance subcarrier signal for developing at said output electrodes current components derived along a predetermined axis of said subcarrier signal; and a frequency-responsive output circuit coupled to said output electrodes for deriving from said current components an output signal having a frequency equal to an integral multiple of the frequency of said subcarrier signal and representative of a chrominance-signal component derived along said predetermined axis of said subcarrier signal.

14. In a color-television receiver, a system for selecting a chrominance-signal component along a predetermined axis of a received chrominance subcarrier signal comprising: first circuit means for supplying a chrominance subcarrier signal; second circuit means for supplying a reference signal having a frequency equal to an integral multiple of the frequency of said subcarrier signal; electrode-controlled circuit means having a beam-intensity control electrode coupled to said second circuit means and having a pair of output electrodes and having electron beam-deflection means coupled to said first circuit means for developing at said output electrodes current components derived along a predetermined axis of said subcarrier signal; and a resonant output circuit coupled to said output electrodes and tuned to an integral multiple of the frequency of said subcarrier signal for deriving from said current components an output signal having a frequency equal to an integral multiple of the frequency of said subcarrier signal and representative of a chrominance-signal component derived along said predetermined axis of said subcarrier signal.

15. In a color-television receiver, a system for selecting a chrominance-signal component along a predetermined axis of a received chrominance subcarrier signal comprising: first circuit means for supplying a chrominance subcarrier signal; second circuit means for supplying a reference signal having a frequency equal to an integral multiple of the frequency of said subcarrier signal; electrode-controlled circuit means having a beam-intensity control electrode coupled to said second circuit means and having a pair of output electrodes and having electron beam-deflection means coupled to said first circuit means for developing at said output electrodes current components derived along a predetermined axis of said subcarrier signal; and a resonant output circuit coupled to said output electrodes and tuned to the second harmonic of said subcarrier signal frequency for deriving from said current components an output signal having a frequency equal to said second-harmonic frequency and representative of a chrominance-signal component derived along said predetermined axis of said subcarrier signal.

16. In a color-television receiver, a system for selecting a chrominance-signal component along a predetermined axis of a chrominance subcarrier signal comprising: first circuit means for supplying a chrominance subcarrier signal; second circuit means for supplying a reference signal having a frequency equal to that of said subcarrier signal; electrode-controlled circuit means comprising an electron-discharge tube of the beam-switching type having a beam-intensity control electrode coupled to said second circuit means for pulsing said tube into conduction during narrow angle conduction intervals in synchronism with said reference signal and having a pair of output electrodes and having electron beam-deflection electrodes coupled to said first circuit means for switching the beam from one output electrode to the other in synchronism with said chrominance subcarrier signal for developing at said output electrodes current components derived along a predetermined axis of said subcarrier signal; and a resonant output circuit coupled to said output electrodes and turned to an integral multiple of the frequency of said subcarrier signal for deriving from said current components an output signal having a frequency equal to an integral multiple of said frequency of said subcarrier signal and representative of a chrominance-signal component derived along said predetermined axis of said subcarrier signal.

17. In a color-television receiver, a system for selecting one or more chrominance-signal components along predetermined axes of a received chrominance subcarrier signal comprising: first circuit means for supplying a chrominance subcarrier signal; second circuit means for supplying a reference signal having a frequency equal to that of said subcarrier signal; electrode-controlled circuit means having a beam-intensity control electrode coupled to said first circuit means and having a pair of output electrodes and having electron beam-deflection means coupled to said second circuit means for switching the electron beam to each output electrode at twice the frequency of said subcarrier signal for developing at said output electrodes current components representative of chrominance-signal components derived along predetermined axes of said subcarrier signal; and frequency-responsive output circuit means coupled to said output electrodes for deriving from said current components output signals having a frequency equal to the frequency of said subcarrier signal and representative of said chrominance-signal components.

References Cited in the file of this patent

UNITED STATES PATENTS

| | | |
|---|---|---|
| 2,274,184 | Bach | Feb. 24, 1942 |
| 2,614,221 | Moll | Oct. 14, 1952 |
| 2,779,818 | Adler | Jan. 29, 1957 |
| 2,891,152 | Altes | June 16, 1959 |

OTHER REFERENCES

Electronics, May 1954, pp. 148 to 151, "Beam-Deflection Tube Simplifies Color Decoders," Adler et al.